United States Patent
Lee et al.

(10) Patent No.: US 11,307,878 B2
(45) Date of Patent: Apr. 19, 2022

(54) PER USER INDEX FOR VIRTUAL DESKTOP

(71) Applicant: MICROSOFT TECHNOLOGY LICENSING, LLC, Redmond, WA (US)

(72) Inventors: Won Hee Lee, Issaquah, WA (US); Adam Donald Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 16/409,755

(22) Filed: May 10, 2019

(65) Prior Publication Data

US 2020/0356390 A1 Nov. 12, 2020

(51) Int. Cl.
*G06F 9/451* (2018.01)
*G06F 16/188* (2019.01)
*G06F 16/13* (2019.01)
*G06F 21/62* (2013.01)

(52) U.S. Cl.
CPC .............. *G06F 9/452* (2018.02); *G06F 16/13* (2019.01); *G06F 16/188* (2019.01); *G06F 21/6218* (2013.01)

(58) Field of Classification Search
CPC ........ G06F 9/452; G06F 16/188; G06F 16/13; G06F 21/6218
USPC ........................................................ 707/831
See application file for complete search history.

(56) References Cited

U.S. PATENT DOCUMENTS

| | | | |
|---|---|---|---|
| 8,762,456 B1 | 6/2014 | Chan et al. | |
| 10,242,014 B2* | 3/2019 | Jain | G06F 16/182 |
| 2007/0094348 A1 | 4/2007 | Scheidel et al. | |
| 2011/0184993 A1* | 7/2011 | Chawla | G06F 9/45533 707/802 |
| 2011/0302211 A1* | 12/2011 | Kilday | G06F 21/6218 707/785 |
| 2012/0054742 A1* | 3/2012 | Eremenko | G06F 9/452 718/1 |
| 2012/0324365 A1 | 12/2012 | Momchilov et al. | |

(Continued)

OTHER PUBLICATIONS

Microsoft Computer Dictionary, 5th Edition, Microsoft Press, Redmond, WA, © 2002, p. 542.*

(Continued)

*Primary Examiner* — Robert Stevens
(74) *Attorney, Agent, or Firm* — Watson Patents, PLC; Vladan M. Vasiljevic

(57) ABSTRACT

A per user system include for a virtual desktop includes a server connected to multiple users, wherein each server hosts multiple application sessions accessible by the users. An indexer hosted on the server can be configured to analyze a file on the server to identify a user that owns the file without input from the application sessions and to save the file to a virtual hard disk (VHD) of the identified user. The VHD can be temporarily saved on the server. A communications device can be connected to the indexer, where the communication device can send the VHD of the identified user from the server to a storage device. A processor can be on a second server, where the processor can retrieve the VHD of the identified user from the storage device and temporarily save the VHD of the identified user on the second server.

20 Claims, 4 Drawing Sheets

(56) References Cited

U.S. PATENT DOCUMENTS

2015/0268980 A1* 9/2015 Russinovich ......... G06F 3/0689
718/1
2019/0340203 A1* 11/2019 Yao ..................... G06F 16/2379

OTHER PUBLICATIONS

Stevens, W. Richard, Advanced Programming in the UNIX Environment, Addison-Wesley Publishing Co., Reading, MA, © 1992, pp. 47 and 55.*

Chivers, et al., "Forensic Data Recovery from the Windows Search Database", In Journal of Digital Investigation, vol. 7, Issue No. 3, Jan. 7, 2011, pp. 114-126.

"International Search Report and Written Opinion Issued in PCT Application No. PCT/US20/028164", dated Jul. 17, 2020, 11 Pages.

"IVANTI—Environment Manager 2018.3 Service Pack 1", Retrieved From: https://help.ivanti.com/ap/help/en_US/em/2018/Ivanti%20Environment%20Manager%202018.3%20SP1%20Release%20Notes.pdf, Retrieved On: Feb. 1, 2019, 7 Pages.

"Service Cloud Deploying Oracle Service Cloud", Retrieved From: https://docs.oracle.com/en/cloud/saas/service/18c/famdg/deploying-oracle-service-cloud.pdf, Retrieved On: Feb. 1, 2019, 102 Pages.

"Working Remotely with Worldox", Retrieved From: https://support.trumpetinc.com/index.php?pg=kb.page&id=2076, Retrieved On: Feb. 1, 2019, 4 Pages.

Brown, Daniel H., "Dealing with Outlook Search in Non-Persistent RDS Environments", Retrieved From: https://docs.microsoft.com/en-us/deployoffice/rds-outlook-search, Aug. 24, 2017, 2 Pages.

Smith, Russell, "Multi-User Windows 10 Powers Windows Virtual Desktop", Retrievd From: https://www.petri.com/multi-user-windows-10-powers-windows-virtual-desktop, Dec. 18, 2018, 9 Pages.

Willkommen, Herzlich, "Citrix", Retrieved From: https://www.digicomp.ch/landingpages/citrixday/assets/pdf/10_Bessere%20Outlook365PerformancemitCitrixProfilManagement_LarisGamper.pdf, Nov. 20, 2018, 25 Pages.

* cited by examiner

PER USER INDEX FOR VIRTUAL DESKTOP

BACKGROUND

The present application is in the field of systems, methods, and computer program products for a per user index within a virtual desktop.

Remote Desktop Services (RDS) allow a user to take control of applications running on a remote server over a network connection. With RDS, only software user interfaces are transferred from the remote server to the client terminal. All input from the client terminal is sent to the remote server, where software execution takes place.

The user's index database and configuration data are typically stored in the user's machine. When a user roams between multiple machines in a machine pool and logs into a new machine, the index database is empty for the user on the new machine. Thus, re-indexing occurs every time that a user switches to a different machine, which is an expensive task that must be performed with respect to time and computing resources. Hence, there is a need for a system and method that can allow a user to roam within multiple machines in a machine pool by without the need to re-index the user's database and configuration data.

SUMMARY

In one general aspect, the systems and techniques disclosed herein are directed to a system including a server connected to multiple users, wherein each server hosts multiple application sessions accessible by the users. An indexer hosted on the server can be configured to analyze a file on the server to identify a user that owns the file without input from the application sessions, and to save the file to a virtual hard disk (VHD) of the identified user. The VHD can be temporarily saved on the server. A communications device can be connected to the indexer, where the communication device can send the VHD of the identified user from the server to a storage device. A processor can be on a second server, where the processor can retrieve the VHD of the identified user from the storage device, and temporarily save the VHD of the identified user on the second server.

A method, in accordance with a second aspect of this disclosure, includes analyzing via an indexer a file on a (RDS) server to identify a user that owns the file without input from application sessions running on the server. The server can be connected to multiple users and can host multiple application sessions accessible by the users. The file can be saved to a virtual hard disk (VHD) of the identified user, where the VHD can be temporarily saved on the server. An aspect of this disclosure can include sending via a communications device the VHD of the identified user from the server to a storage device. Another aspect of this disclosure can include retrieving via a processor the VHD of the identified user from the storage device and temporarily saving the VHD of the identified user on a second (RDS) server. The second server can host a session accessible by the identified user.

A computer program product for determining a group sentiment, in accord with a third aspect of this disclosure, includes a computer readable storage medium having encoded thereon instructions executable by a processor to cause the processor to analyze a file on an RDS server to identify a user that owns the file without input from desktop sessions running on the RDS server. The RDS server can be connected to multiple users and host multiple desktop sessions accessible by the users. The instructions cause the processor to save the file to a virtual hard disk (VHD) of the identified user, where the VHD is temporarily saved on the RDS server. The processor is controlled to send the VHD of the identified user from the RDS server to a storage device. The processor is controlled to retrieve the VHD of the identified user from the storage device and temporarily save the VHD of the identified user on a second RDS server. The second RDS server can host a session accessible by the identified user.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
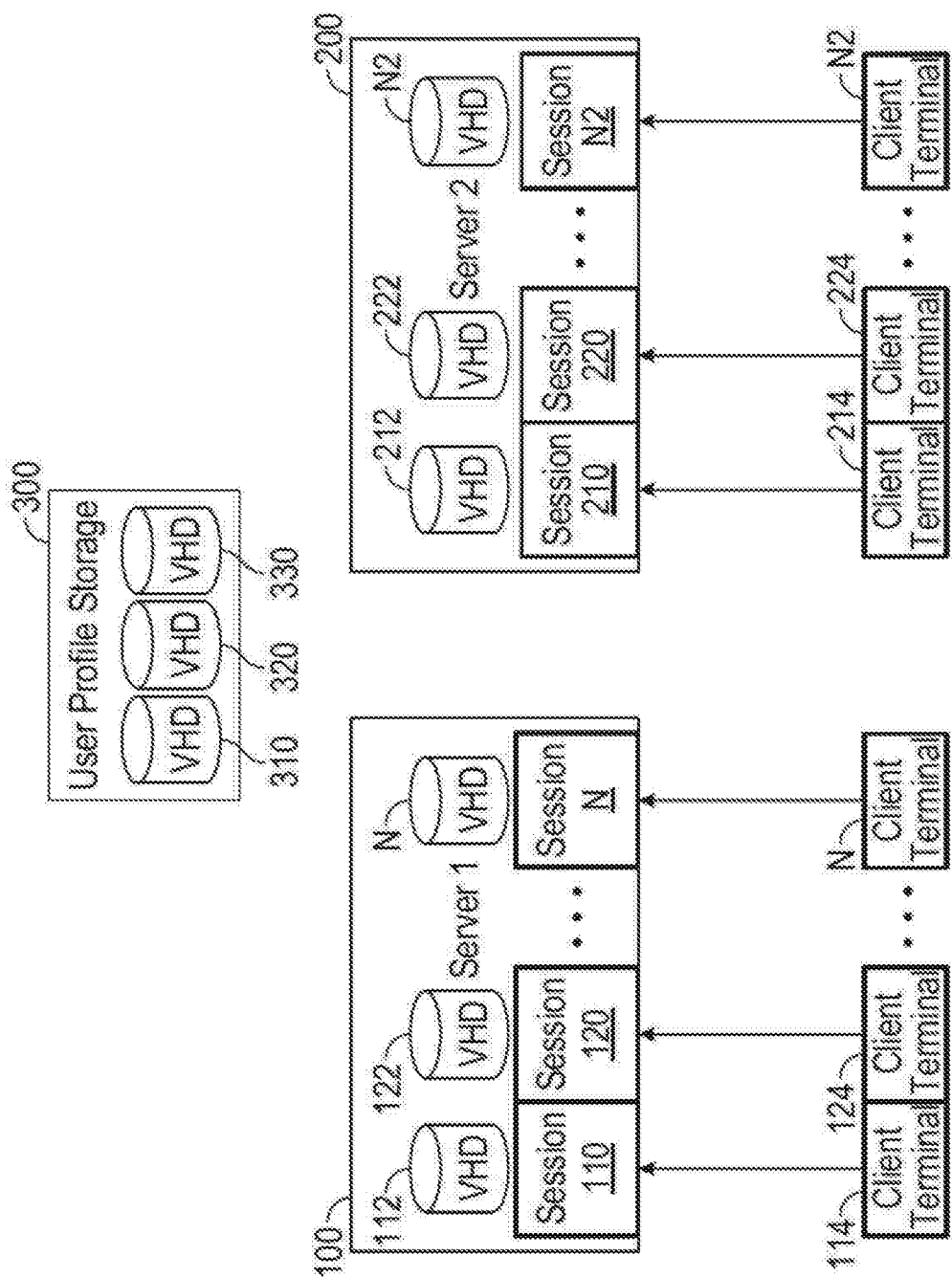
FIG. 1 is a diagram illustrating a system for a per user index for a virtual desktop in accord with aspects of the invention, where multiple client terminals are connected to multiple servers in a network.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A system is provided that can allow a user to roam within multiple machines in a machine pool by supporting per user indexing in an RDS environment. Indexing for a user's content, such as, for example, Outlook® email, can be stored in a separate per user index (also referred to herein as an "index file"). Thus, user indexing is not stored only on the user's machine; rather, the per user indexing can roam with the user wherever the user login occurs. More specifically, the system can encapsulate the users index and configuration data into a user profile location, and dynamically load and unload the data based on a user logon or logoff event. Based on this, a query from a user session can be scoped into the per user index so that the query is fulfilled with the user data only. The RDS environment may set up user profile roaming as a virtual hard disk (VHD) mount and unmount to implement this feature.

In at least one implementation, SearchIndexer (also referred to herein as the "indexer") is an available file indexing utility for searches. The system can address performance bottlenecks in, e.g., a Windows® Virtual Desktop (WVD) environment, by providing a roamable per user index. SearchIndexer can provide this unblock adoption of a fast search scenario, such as, for example, in an Outlook® email search in a WVD environment.

During a set up phase, SearchIndexer can prepare a per user index data file under the roaming section of the user profile storage. SearchIndexer can also configure the per user index into a user hive of registry, which can also be under the roaming section of the user profile storage. Next, SearchIndexer can hook into the user log on and user log off notification, and dynamically load and unload the per user index. For indexing operations, SearchIndexer can identify an item that an application is requesting to be indexed, and identify who owns the item. SearchIndexer can also identify the file path used, and for push items such as an application programming interface (API) call, the caller's context can be retrieved. For querying operations, the client's context can be retrieved and re-directed to the per user index in order to serve the query.

Accordingly, at least one implementation provides a roamable per user index that is self-contained with data and configuration provided, which eliminates the need for re-indexing every time a user logs on to a new machine in the machine pool. This can be enabled by dynamic load and unload operations of the per user index when the user logs on and off from a WVD machine. Re-direction indexing and querying of user data can be seamlessly done in order to provide a fast search service with less cost than previous versions.

FIG. 1 is a diagram illustrating a system for a per user index for Windows® virtual desktop, wherein the system includes a server 100, one or more servers 200, and a user profile storage device 300. In at least one implementation, the servers 100 and 200 are each connected to multiple client terminals (also referred to herein as "users"), where each of the servers 100 and 200 host multiple application sessions that can be accessible by the client terminals. In the example illustrated in FIG. 1, server 100 is connected to client terminals 114, 124, and N; and, and server 200 is connected to client terminals 214, 224, and N2. Server 100 can host session 110 accessible by client terminal 114, session 120 accessible by client terminal 124, and session N accessible by client terminal N. In addition, server 200 can host session 210 accessible by client terminal 214, session 220 accessible by client terminal 224, and session N2 accessible by client terminal N2. Each of the sessions 110, 120, N, 210, 220, and N2 is isolated from others in their respective servers. In other implementations, the system can include up to or greater than hundreds of servers where each server hosts and is connected to hundreds of client terminals running hundreds of application sessions on each server. Although FIG. 1 labels items 114, 124, N, 214, 224, and N2 as "client terminals", in other implementations, 114, 124, N, 214, 224, and N are referred to as "client devices", "client machines", "remote devices", "user devices", "user machines", or "users".

In at least one implementation, the system can include a Remote Desktop Services (RDS) platform where all of the remote clients connect to a centralized set of RDS servers for their computing needs. These RDS servers can run a specialized version of Windows® or other operating system that supports a number of different configurations. User profile disks (UPDs, also referred to herein as an "index file" or a "per user index") can be stored on a network file share as virtual hard disk (VHD) files and can contain all of the information that is roamed with a user between sessions. The folder paths can be set by an information technology (IT) administrator and NTUSER.dat can be included in the UPD to enable index roaming.

The servers 100 and 200 can be remote desktop session hosts (RDSH) by hosting multiple desktop sessions that are accessible by remote users over the network. In the example illustrated in FIG. 1, VHDs 112, 122, and N are mounted on server 100; and, VHDs 212, 222, and N2 are mounted to server 200. In one specific example, the term "mounted" includes attaching a storage peripheral to a single machine, where information is driven by the machine and not the storage peripheral. VHDs 112, 122, and N can be associated with sessions 110, 120, and N, respectively, and thus client terminals 114, 124, and N respectively. Similarly, VHDs 212, 222, and N2 can be associated with sessions 210, 220, and N2, respectively, and thus client terminals 214, 224, and N2 respectively. When the client terminals are not connected to the servers, the VHDs associated with the client terminals can be sent to a user profile storage device. For example, as illustrated in FIG. 1, VHDs 310, 320, and 330 are stored on user profile storage device 300 because their respective client terminals are not connected to a server.

It may be assumed that all users have existing UPDs and have gone through the first log on process, but there may be a mix between users who are logging in for the first time and return users. The mount points or even mount drives may not be consistent between the servers. Server 100 and server 200 may mount at different drive letters or different paths on those drives. Since multiple users will be logged in at the same time, keeping CPU consumption to a minimal may be a concern. In at least one implementation, multiple users will have shared CPU resources, so one user consuming a lot of CPU will impact neighboring sessions.

The users may use many programs during their sessions, create content, and share content with their peers. This can include browsing the internet, syncing email, using OneNote®, saving files or searching for files (e.g., using Cortana® and/or File Explorer), and/or using Universal Windows® Platforms (UWPs) to interact with local files on their profile. While the users are performing these operations, it may be a concern to keep the experience as close to having a thick client as possible. (Thick clients are full-featured computers that are connected to a network. Unlike thin clients, which lack hard drives and other features, thick clients are functional whether they are connected to a network or not.) Many of the users may neither notice nor care that they are running on a remote, shared machine and will simply expect their session to run smoothly.

Figure 2:
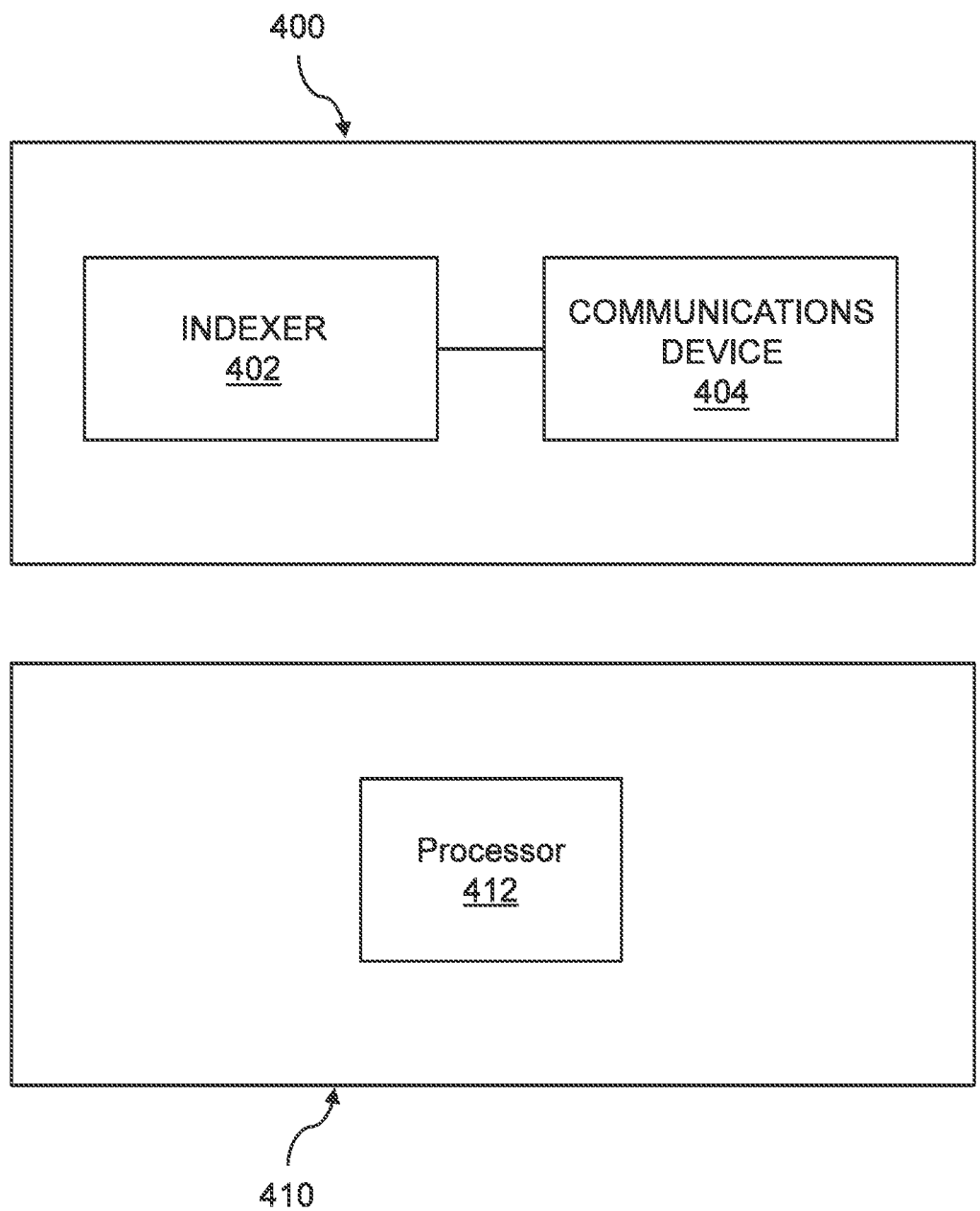
FIG. 2 is a diagram illustrating a system for managing data on servers in accord with aspects of the invention, where the system includes an indexer, a communications device, and a processor.

FIG. 2 is a diagram illustrating a system for managing data on servers, wherein the system includes a server 400 connected to multiple remote users, and the server hosts multiple application sessions accessible by the users. In at least one implementation, the server 400 is an RDS server hosting multiple desktop sessions that are accessible by remote thin client terminals over a network. The server 400 can include an indexer 402 and a communications device 404.

As used herein, the term "indexer" includes a computer hardware component (e.g., a processor) that provides fast local search of files, email, internet history, and more. The indexer 402 can run searchindexer.exe, searchprotocolhost.exe, and searchfilterhost.exe, available from Microsoft Corporation, Redmond, Wash., USA. As described more fully below, the indexer 402 can analyze a file created by one of the application sessions running on the server 400 and/or metadata of the file. The analysis performed by the indexer 402 can identify the user that created and owns the file without input from the application sessions, or before input from the application sessions is provided to the indexer 402. In other words, in at least one implementation, the programs running in the application sessions do not communicate to the indexer 402 who created the file, who owns the file, who has access to the file, and/or where to save the file. The indexer 402 can analyze the file or the file metadata on its own to determine this information.

More specifically, the indexer 402 can include a sniffer, which is a program and/or device that monitors data traveling through the server 400 in order to monitor a handle number i.e., a number that the operating system assigns temporarily to a file when it is opened, of the file. The operating system uses the handle number internally when accessing the file. The indexer 402 can monitor the handle number of the file when a process running in one of the application sessions is writing to the file in order to identify the application session writing to the file. Once the application session writing to the file is known, the application session can be mapped back to the client terminal connected to the application, and thus the user who created and owns the file. The indexer 402 can also analyze paths in the application sessions to identify locations where the file is written to. The indexer 402 can then map the identified locations back to a user in order to identify the user who created and owns the file. The indexer 402 can manage users logged on to the system and their profile directory paths; and, when file activity is detected, the indexer 402 can determine where the file belongs by looking through the profile directory path. For example, for the user 'FOO', the indexer 402 can determine that the profile directory path for this user is "c:\users\foo." When a file is created having the path "c:\users\foo\documents\patent-draft.docx," the indexer 402 can scan through a list of profile directory paths for all of the users to identify a matching beginning port of the file path. If a match is found, the indexer 402 can identify that the user 'FOO' owns the profile directory.

In addition, the indexer 402 can analyze a list of all of the users that have access to the file (i.e., the access control list) in order to identify the user who created and owns the file. The indexer 402 can also analyze an attribute of the file to identify the user that created and owns the file. For example, for an encrypted file, there is a special API to meta information of the file called EncryptionOwner that allows the indexer 402 to determine ownership of the file.

In at least one implementation, an administrator of the system can categorize files on the server 400 as relevant. The indexer 402 can be configured to analyze only files and metadata of files that are categorized as relevant by the administrator of the system. The process of determining who the user is that created and owns a file can be expensive with respect to time and resources. The system can control which files the indexer 402 will consider for indexing by mapping the paths that the administrator says should be interesting (e.g., files in the "MyDocuments" folder) into the file system of the VHD to make sure that the indexer 402 does not search through files that do not make sense, thereby wasting CPU resources.

The indexer 402 can save the metadata of the file to a VHD of the identified user that is temporarily mounted to the server 400. Specifically, the indexer 402 can save the metadata of the file to an index file of the identified user that resides on the VHD of the identified user. As described above, VHDs can contain all of the information that is roamed with a user between sessions.

The indexer 402 can be connected to the communications device 404. As used herein, the term "communications device" includes a computer hardware component (e.g., a processor, antenna, port) that sends the VHD of the identified user from the server 400 to a storage device when the identified user logs out of his or her client terminal. As used herein, the term "connected" can include operationally connected, logically connected, in communication with, physically or wirelessly connected, engaged, coupled, contacts, linked, affixed, and attached.

The system can further include a second server 410 (e.g., an RDS server) connected to multiple users, where the second server 410 can host multiple application sessions accessible by the users. The system can include up to hundreds or greater of servers where each server hosts and is connected to up to hundreds or greater of client terminals running up to hundreds or greater of applications sessions on each server. In at least one implementation, the second server 410 is the same as the first server 400.

The second server 410 can include a port that connects the second server 410 to a client terminal of the identified user, where the second server 410 hosts a session accessible by the identified user. The second server 410 can also include a processor 412 that retrieves the VHD of the identified user from a storage device and temporarily mounts the VHD of the identified user to the second server 410 when the identified user logs into his or her client terminal. Specifically, the processor 412 can access the index file of the identified user that resides on the VHD of the identified user. This can be performed when the identified user logs onto the server 410 from his or her client terminal. Thus, the system can allow users to roam within multiple machines in a machine pool by supporting per user indexing in an RDS environment.

Figure 3:
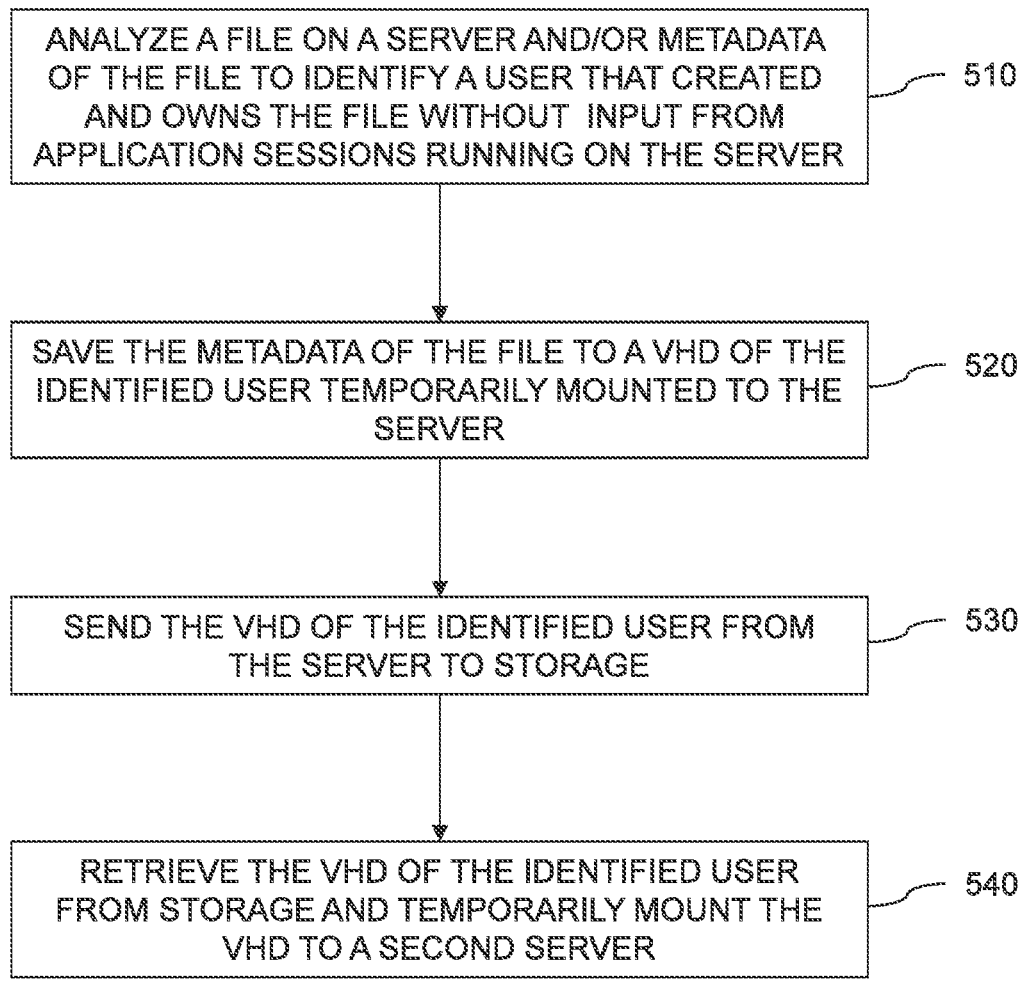
FIG. 3 is a flow diagram illustrating a method for managing data on servers in accord with aspects of the invention, where a file on a server and/or metadata of the file are analyzed to identify a user that created and owns the file without input from application sessions running on the server.

FIG. 3 is a flow diagram illustrating a method for managing data on servers, where each server is connected to multiple users, and where each server hosts multiple application sessions accessible by the users. As described above, the method can be performed on an RDS platform where all of the remote users connect to a centralized set of RDS servers for their computing needs. A file on a server and/or metadata of the file on the server can be analyzed to identify a user that created and owns the file without input from application sessions running on the server (510).

More specifically, a sniffer can be utilized to monitor data traveling through the server in order to monitor a handle number assigned to the file by an operating system of the server. The handle number of the file can be monitored when an application running one of the application sessions is writing to the file in order to identify the application session writing to the file. Once the application session writing to the file is known, the application session can be mapped back to the client terminal connected to the application, and thus the user who created and owns the file. Paths in the application sessions can also be analyzed to identify locations to which the file is written. The identified locations can then be mapped back to a user in order to identify the user who created and owns the file. In addition, attributes of the file and/or the access control list of the file can be analyzed in order to identify the user who created and owns the file. In at least one implementation, an administrator of the system categorizes files on the server as relevant; and, only files and metadata of files that are categorized as relevant by the administrator of the system as relevant are analyzed.

The metadata of the file can be saved to a VHD of the identified user temporarily mounted to the server (520). More specifically, the metadata of the file can be saved to an index file of the identified user that resides on the VHD of the identified user. In at least one implementation, analyzing and saving can be performed by an indexer. When the identified user logs out of his or her client terminal, the VHD of the identified user can be sent via a communications device from the server to a storage device (530). As described above, VHDs can contain all of the information that is roamed with a user between sessions.

When the identified user logs in to his or her client terminal, the VHD of the identified user can be retrieved from the storage device and temporarily mounted to a second server (540). The second server can now host a session that can be accessible by the identified user. The session hosted on the second server can access the index file of the identified user that resides on the VHD of the identified user. Because the user's index file is now on the second server, the need to re-index the identified user's files is eliminated.

Aspects of the present device and methods may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
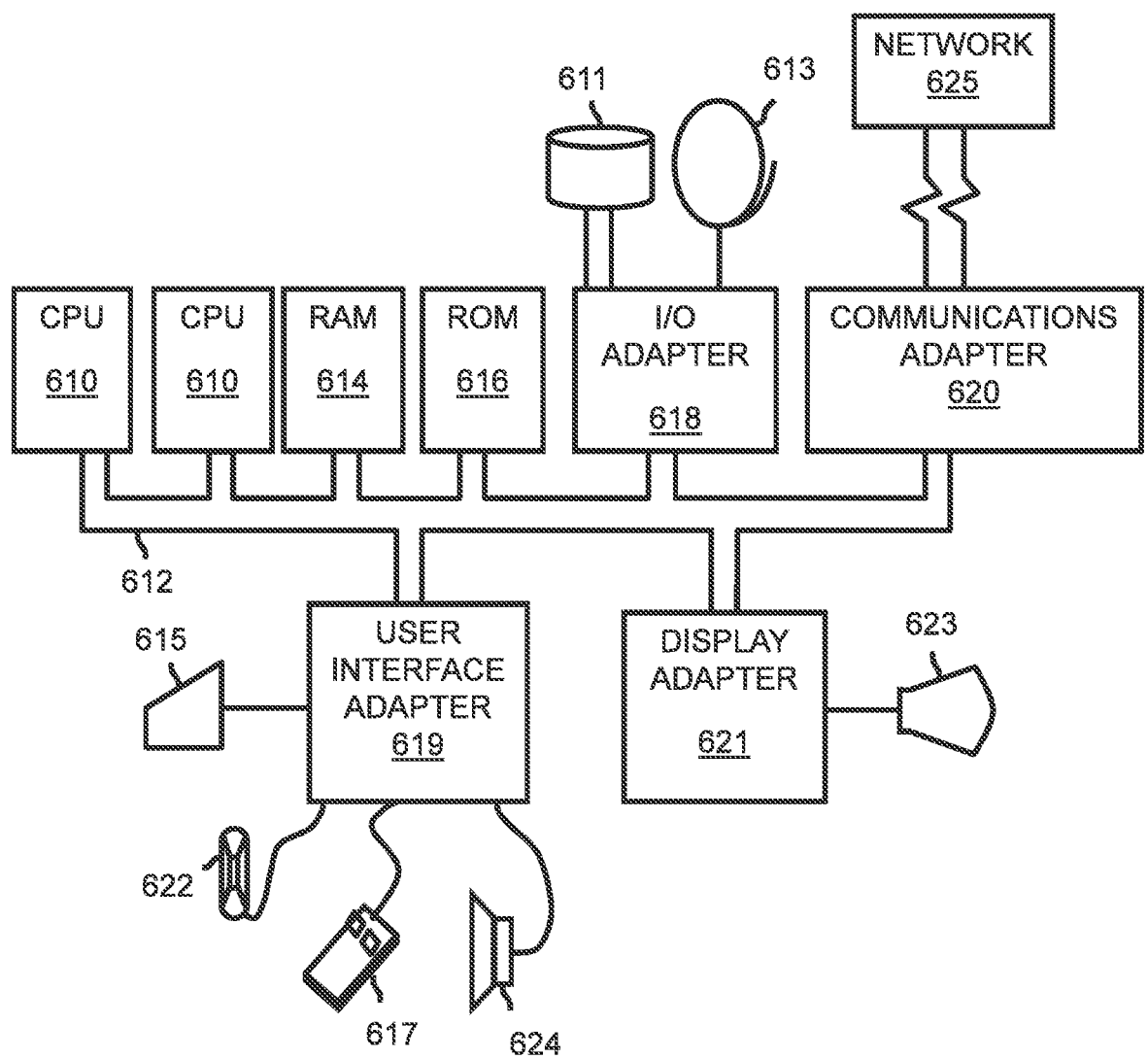
FIG. 4 is a diagram illustrating a computer program product for managing data on servers in accord with aspects of the invention, where a hardware configuration of an information handling/computer system is provided.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 610. The CPUs 610 are interconnected with system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of at least one embodiment of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system comprising:
    a server hosting multiple application session virtual computing environments such that any one of the application session virtual computing environments can be utilized by any one of multiple users; and
    a computer readable storage medium having encoded thereon program instructions executable by the server to cause the server to:
        analyze a first file on the server to identify a first user, for whom the first file is to be indexed for searching, the identifying being without input from the application session virtual computing environments; and
        index the first file into a search index on a virtual hard disk (VHD) of the first user, wherein the VHD is independently maintained from the application session virtual computing environments and is temporarily mounted to the server as part of the first user's utilization of any of the application session virtual computing environments hosted by the server.

2. The system according to claim 1, wherein the is program instructions causing the analyzing the first file comprise program instructions that cause the server to analyze a first attribute of the first file, the identifying the first user being based on the first attribute.

3. The system according to claim 1, wherein the program instructions causing the analyzing the first file comprise program instructions that cause the server to
    identify a first application session virtual computing environment accessing the first file, the identifying the first user being based on the identified first application session virtual computing environment.

4. The system according to claim 3, wherein the computer storage medium has encoded thereon further program instructions executable by the server to cause the server to:
    monitor data access by the application session virtual computing environments hosted by the server to detect a handle number that is temporarily assigned to the first file when it is accessed by the first application session virtual computing environment;
    wherein the identifying the first application session virtual computing environment is based on the detected handle number.

5. The system according to claim 1, wherein the program instructions causing the analyzing the first file comprise program instructions that cause the server to analyze an access control list, associated with the first file, that identifies users that have access to the first file, the identifying the first user being based on the users identified by the access control list.

6. The system according to claim 1, wherein the program instructions causing the analyzing the first file comprise program instructions that cause the server to identify a profile directory paths utilized to access the first file in a first application sessions virtual computing environment, the identifying the first user being based on the identified profile directory path.

7. The system according to claim 6, wherein the program instructions causing the identifying the first user based on the identified profile directory path comprise program instructions that cause the server to scan through a list of profile directory paths of multiple users to identify a matching beginning part of the identified profile directory path.

8. The system according to claim 1, wherein the indexer is analyzes the first because a location of the first file has been mapped into a file system of the VHD of the first user.

9. A method comprising:
analyzing a first file on a server to identify a first user, for whom the first file is to be indexed for searching, the identifying being without input from application session virtual computing environments running on the server, wherein the server hosts multiple application session virtual computing environments such that any one of the application session virtual computing environments can be utilized by any one of multiple users; and
indexing the first file into a search index on a virtual hard disk (VHD) of the first user, wherein the VHD of the first user is independently maintained from the application session virtual computing environments and is temporarily mounted to the server as part of the first user's utilization of any of the application session virtual computing environments.

10. The method according to claim 9, wherein the analyzing the first file comprises analyzing a first attribute of the first file, the identifying the first user being based on the first attribute.

11. The method according to claim 9, wherein the analyzing the first file comprises
identifying a first application session virtual computing environment accessing the first file, the identifying the first user being based on the identified first application session virtual computing environment.

12. The method according to claim 11, further comprising:
monitoring data access by the application session virtual computing environments running on the server to detect a handle number that is temporarily assigned to the first file when it is accessed by the first application session virtual computing environment;
wherein the identifying the first application session virtual computing environment is based on the detected handle number.

13. The method according to claim 9, wherein the analyzing the first file comprises analyzing an access control list, associated with the first file, that identifies users that have access to the first file, the identifying the first user being based on the users identified by the access control list.

14. The method according to claim 9, wherein the analyzing the first file comprises identifying a profile directory paths utilized to access the first file in a first application sessions virtual computing environment,
the identifying the first user being based on the identified profile directory path.

15. The method according to claim 14, wherein the identifying the first user based on the identified profile directory path comprises scanning through a list of profile directory paths of multiple users to identify a matching beginning part of the identified profile directory path.

16. The method according to claim 9, wherein the first file is analyzed because a location of the first file has been mapped into a file system of the VHD of the first user.

17. A computer program product comprising:
a computer readable storage medium having encoded thereon
program instructions executable by a processor to cause the processor to:
analyze first file on server to identify a first user, for whom the first file is to be to be indexed for searching, the identifying being without input from desktop session virtual computing environments running on the server, wherein
the server hosts the desktop session virtual computing environments such that any one of the desktop session virtual computing environments can be utilized by any one of multiple users; and
index the first file into a search index on a virtual hard disk (VHD) of the first user, wherein the VHD of the first user is independently maintained from the desktop session virtual computing environments and is temporarily mounted to the server as part of the first user's utilization of any of the desktop session virtual computing environments.

18. The computer program product according to claim 17, wherein the program instructions causing the analyzing the first file comprise program instructions that cause the processor to analyze a first attribute of the first file, the identifying the first user being based on the first attribute.

19. The computer program product according to claim 17, wherein the program instructions causing the analyzing the first file comprise program instructions that cause the processor to
identify a first desktop session virtual computing environment accessing the first file, the identifying the first user being based on the identified first application session virtual computing environment.

20. The computer program product according to claim 17, wherein the first program instructions causing the analyzing the first file comprise program instructions that cause the processor to analyze an access control list, associated with the first file, that identifies users that have access to the first file, the identifying the first user being based on the users identified by the access control list.

* * * * *